Patented Dec. 11, 1951

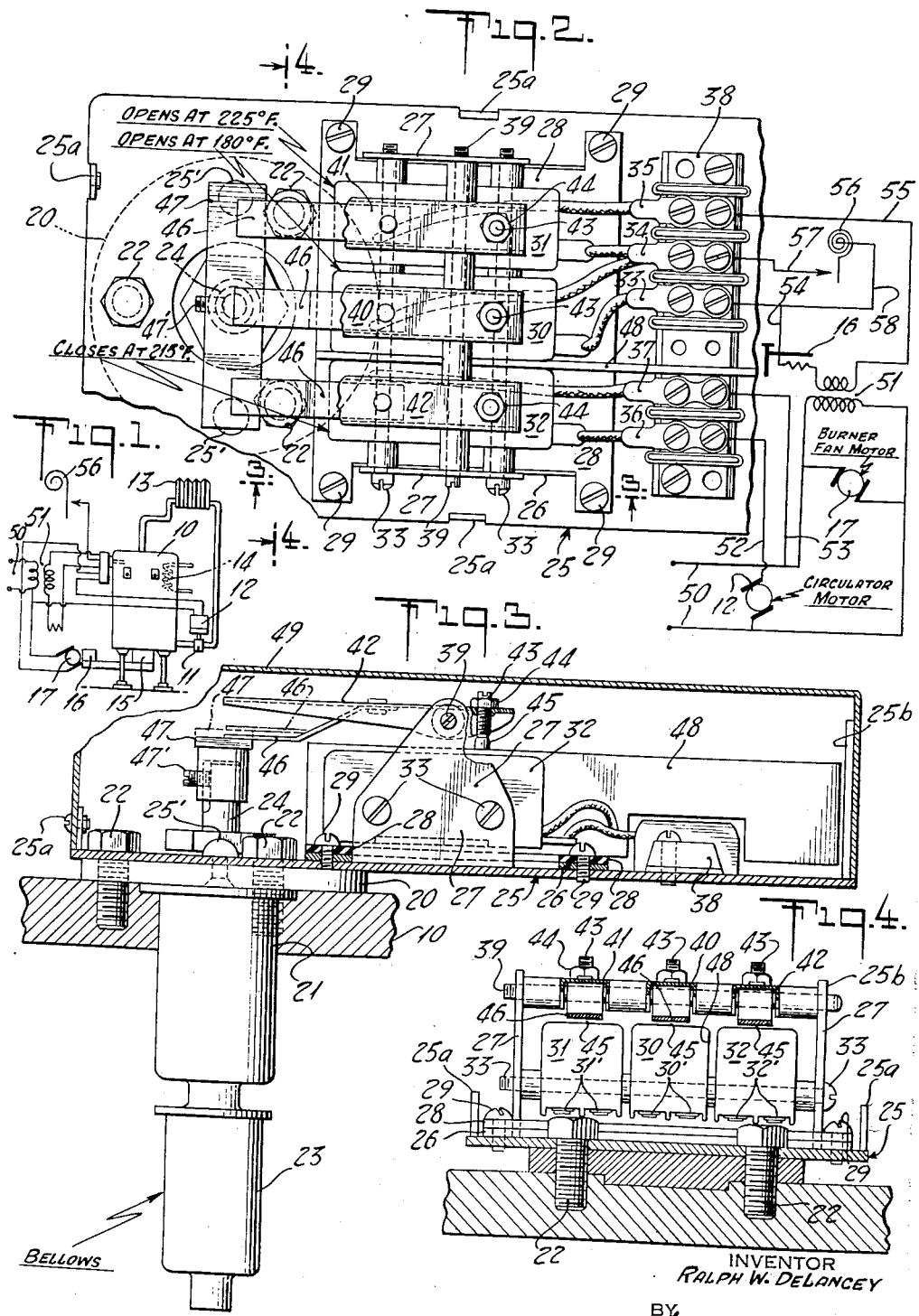

2,578,340

UNITED STATES PATENT OFFICE 2,578,340

HOT WATER HEATING SYSTEM AND CONTROL THEREFOR

Ralph W. De Lancey, Meriden, Conn., assignor to The Miller Company, Meriden, Conn., a corporation of Connecticut Application May 6, 1948, Serial No. 25,474

8 Claims. (Cl. 236—9)

The present invention relates to hot water heating systems and controls therefor and is more particularly directed toward such systems using intermittently fired boilers for heating domestic hot water or for heating hot water for forced circulation, and to controls for such systems.

In the operation of forced circulation hot water heating systems which also supply heat for domestic hot water, it is desirable to be able to operate the boiler at different ranges of temperature for domestic hot water and for heating and to control the operation of the burner and circulator in accordance with the operation desired.

The present invention contemplates the use of a single thermal motor operating a plurality of switches in sequence for effecting the control of the burner and the circulator so as to provide domestic hot water and hot water for heating as required in the space to be heated.

The present invention is suitable for use with intermittently fired automatic fuel burners either of the stoker or oil burner type and may be used in heating systems wherein the controls are of the low voltage or high voltage type. According to the present invention, the same thermal motor is employed to control three switches—one a low temperature (or low limit) switch which opens when the boiler is at a sufficiently high temperature to provide domestic hot water; a second (or high limit) switch, also normally closed, which opens should the boiler reach an excess temperature; and a third switch, normally open, but which closes at a temperature intermediate the opening temperatures of the other switches. The low temperature switch used for keeping the water temperature suitable for domestic hot water supplied is in shunt with a room thermostat, so that when the thermostat calls for heat the boiler can operate at a temperature above that for which the low limit switch is set.

The accompanying drawings show, for purposes of illustrating the present invention, an embodiment in which the invention may take form, it being understood that the drawings are illustrative of the invention rather than limiting the same.

In the accompanying drawings:

Figure 1 is a diagrammatic view of a heating plant with a superimposed wiring diagram;

Figure 2 is an elevational view of the switch mechanism and also showing the wiring diagram;

Figure 3 is a sectional view of the mechanism of Fig. 2 on the line 3—3 thereof, showing it mounted in a boiler wall; and Figure 4 is a cross-sectional view of Fig. 2 looking in the direction of the arrows.

In the drawings, a conventional hot water heating boiler is indicated at 10. It is connected through a circulator 11 operated by a circulator motor 12 with radiation indicated at 13. It is also provided with a heating coil 14 for domestic hot water and is shown as being fired by a pot type burner 15 having oil control in the form of a thermal metering valve indicated at 16, and a blower 17 for providing forced draft.

The control switch shown in detail in Figs. 2, 3 and 4 has a gland 20 secured opposite an opening 21 in the boiler wall by bolts indicated at 22. This gland carries a thermal motor of conventional type having a bellows or other thermally responsive element at 23 disposed inside the boiler and subject to boiler water temperature. This bellows operates a plunger or rod 24 which extends out through the gland and is externally accessible.

A sheet metal plate 25 is secured to the gland disc 20 by rivets indicated at 25'. This plate 25 has cover securing ears 25a and an upwardly bent end 25b adapted to carry the cables which carry the wiring. It also carries a sub-frame or saddle 26 with upwardly bent ears 27—27. The base portion of the sub-frame is covered by an insulating plate 28 and these parts are secured to the plate 25 by screws 29. Three totally enclosed snap switches are indicated at 30, 31 and 32. These switches are secured to the sub-frame by bolts 33—33 which pass through the ears 27 and the bodies of all the switches. The terminals of these switches are at the bottom as indicated at 30', 31' and 32', respectively, and are protected by the insulating plate 28. Wires from the terminals of the switches lead to the right as indicated in the drawings and are secured to binding posts 33 to 37, inclusive, these binding posts being carried on an insulating block 38 or barrier strip. The side members 27 of the frame 26 also carry a bolt 39 above the switches on which is mounted three rocker arms 40, 41 and 42. These rocker arms are alike and each is provided with an extruded threaded hole to receive an adjustable screw 43 carrying lock nut 44. The lower end of the screw being adapted to engage and operate the pin 45 for the corresponding switch. The longer end of each rocker arm carries a leaf spring 46, and these three leaf springs overlie a bar or plate 47 secured to the bellows actuated rod or shaft 24 by a screw 47'. These springs are stiff enough to transmit power to operate the switches, but may yield after the switches are actuated. An insulating plate 48 is mounted between switches 30 and 32 and extends over beyond the binding posts, so as to separate the high tension side of the structure from the low tension side. The switches and wiring are protected by a cover 49 secured to lugs 25a.

The power line 50 is connected with the primary of a transformer 51, the forced draft blower motor 17, and to the circulator motor 12. The latter connection is through wires 52 and 53 connected to the terminals 36 and 37, respectively, and these in turn are connected to the normally open switch 32.

The secondary of the transformer 51 is connected through the heater element of the usual thermostatically operated metering valve 16 and wire 54 with the binding post 33 connected to switch 30. The other side of the transformer 51 is connected by a wire 55 with binding post 35 connected to switch 31. The wire 57 connects one side of the room thermostat 56 with the binding post 34 which in turn is connected to both switches 30 and 31. The other side of the thermostat is connected, as indicated at 58, with the binding post 33.

The screw 47' makes it possible to select a preliminary adjustment of plate 47 such that at room temperature the plate 47 is not in engagement with any of the springs 46. The screw 43 carried by the rocker arms are so adjusted that (1) when the boiler water exceeds a temperature such as 180°, suitable for boiler temperature for domestic hot water service, the switch 30 will open; (2) when a higher temperature, such as 215° F. is reached the circulator switch 32 is closed; and (3) when an excess temperature such as 225° F. is reached, switch 31 is opened. When these adjustments are completed, screws 47 and 43 are soldered in place to prevent tampering.

The switch 30 acts as a low limit switch so as to keep the burner in operation and maintain the boiler at 180° F. temperature. Should the room thermostat 56 in the space to be heated, however, call for heat and close the circuit between wires 57 and 58, the switch 30 will be shunted by the room thermostat so that the opening of switch 30 is not effective to shut down the burner. The burner will then operate to increase the temperature of water in the boiler and the thermal motor 23 will then move the plate 47 upwardly as shown in Fig. 3, bending the spring 46 for rocker arm 40 and when a higher temperature is reached such as 215° F. (a desirable temperature for circulating water in a closed hot water heating system) this switch closes and starts the circulator in operation. Circulator operation will then continue as long as the water is above 215° F. If for any reason the circulator does not dissipate the heat fast enough to prevent the continued rise of the boiler water temperature, the temperature may continue until it reaches a temperature such as 225° F. at which time the rocker arm 40 actuates the switch 31 and opens the control circuit for the burner.

It will thus be seen that a single thermal motor which requires but one opening in the boiler wall for mounting it may be employed to operate a low limit switch, the high limit switch, and the circulator control.

It will of course be understood that when it is desired to employ one thermal element to control a plurality of separate circuits that the wiring from each switch can be taken out to terminals independent of the terminals used for the other switches. In such a case, a switch such as shown in the drawings herein would be wired for operating three independent circuits by connecting both leads from switch 30 to independent terminals on the terminal block 38.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A hot water heating system comprising a boiler, a hot water circulating system including radiation in a space to be heated and a motor operated circulator, a thermostat in the space to be heated, an intermittently operated, electrically controlled fuel burner for heating the boiler, a thermal motor subject to the temperature of the boiler water, and three switches, means for operating the three switches at different temperatures from the thermal motor, said means including individual levers adjustably connected at one end with the corresponding switch and having a yieldable spring on the other end to allow overtravel of the thermal motor two of the switches being in series with one another and with the burner operating controls and normally closed and the third switch being normally open and closing at a temperature intermediate the opening temperatures for the other two, the third switch being connected to the circulator motor to control it, the lower temperature opening switch of the first two being in parallel with a circuit including the room thermostat whereby, when the higher temperature opening switch is closed, the burner operating circuit may be established by the room thermostat to increase the temperature of the water in the boiler to a temperature higher than that which satisfies the lower temperature normally closed switch so that the circulator motor control switch may be closed.

2. A limit switch for use with boilers comprising a gland adapted to be secured about an opening in the wall of a boiler, a switch mounting plate carried by the gland on its exposed side, a thermal motor carried by the gland and having a temperature responsive member extending inwardly of the gland and a switch operator carried beyond the switch mounting plate, three rocker arms supported from the mounting plate, spring driving connections between the rocker arms and switch operator whereby the rocker arms may be successively moved with increase of temperature and the springs deformed to allow overtravel, a switch operable by each rocker arm, two of the switches being normally closed and in series with one another, and openable in the thermal motor at two different temperatures, three terminals for the said two switches whereby an external circuit may be opened at the lower temperature or held closed by an external switch in shunt with the lower temperature switch, and a third normally open switch closable by the thermal motor at a temperature intermediate the opening temperature of the first mentioned switches.

3. A limit switch for use with boilers as claimed in claim 2, having a sub-frame in which the switches and rocker arms are secured.

4. A limit switch for use with boilers as claimed in claim 2, wherein each rocker plate carries an adjustable switch actuating screw.

5. For use with a boiler having an opening in the wall thereof, a thermal motor having a gland securable about the opening, an expansion bellows extending away from the gland and adapted to enter the boiler and reciprocable rod actuated by the bellows and extending out through the gland, a plate carried by the rod for movement therewith, a plurality of rocker arms pivoted on an axis at right angles to the axis of the rod and having ends carrying springs overlying the plate and ends carrying adjustable switch operating screws, switches having plungers engaged by the screws, two of the switches being in series and normally closed and openable at different temperatures, the third switch being normally open and closable at an intermediate temperature, and an external switch in shunt with the lower temperature normally closed switch.

6. A heating system for domestic hot water and for hot water heating, comprising a boiler, a hot water circulating system including radiation in a space to be heated and a motor operated circulator, a domestic hot water heating coil in the boiler, a thermostat in the space to be heated, an intermittently operated, electrically controlled fuel burner for heating the boiler, a thermal motor subject to the temperature of the boiler water, three switches operated by the thermal motor at different temperatures and a common mounting member for the thermal motor and switches, two of the switches being in series with one another and with the burner operating controls and normally closed, the first one at a temperature suitable for domestic hot water and the second at a temperature excessively high for hot water heating, so that burner operation is normally had at temperatures below that at which the lower temperature switch opens but not above the temperature at which the upper temperature switch opens, the third switch being normally open and closing at a temperature intermediate the opening temperatures of the first and second switches, the third switch being connected to the circulator motor to control it, whereby the circulator motor is operated only at temperatures above that for domestic hot water heating alone, the first switch being in parallel with a circuit including the room thermostat whereby, when the second switch is closed, the burner operating circuit may be established by the room thermostat to increase the temperature of the water in the boiler to a temperature higher than that which satisfies the first normally closed switch so that the circulator motor control switch may be closed only after the boiler water temperature has exceeded the said lower temperature.

7. A hot water heating system as claimed in claim 6 wherein the mounting plate is carried externally of the boiler by a gland member secured to the boiler about an opening in its wall and the thermal motor has an expansion element carried inside the boiler and operatively connected to a switch operator outside the boiler.

8. A control unit for hot water boilers comprising a mounting plate adapted to be secured to the exterior of a boiler and carrying a thermal motor normally in the boiler and provided with a reciprocable shaft carrying a plate normally outside the boiler, three switches secured to the mounting plate and disposed alongside one another to one side of the reciprocable shaft, the switches having exposed operating plungers, two of the switches being normally closed and in series with one another and one of the switches being normally open, a rocker shaft between the plungers and the shaft carried plate, and three rocker arms on the rocker shaft, each rocker arm having a plunger actuator to press on the corresponding plunger and shift the switch to its other position and a yieldable spring engageable by the thermally moved plate, the spacing of the respective plungers, plunger actuators, springs and thermally moved plate being such that, upon increase in temperature through the range including the opening temperatures for the first and second switches, the respective switches are actuated and the corresponding springs flexed to allow overtravel of the thermally moved plate to actuate the switches seriatim.

RALPH W. DE LANCEY.

REFERENCES CITED

The following references are of record in the file of this patent:

UNITED STATES PATENTS

| Number | Name | Date |
|---|---|---|
| 1,921,708 | Snavely | Aug. 8, 1933 |
| 2,073,676 | Broderick | Mar. 16, 1937 |
| 2,139,052 | White | Dec. 6, 1938 |
| 2,159,284 | Miller | May 23, 1939 |
| 2,162,337 | Kriechbaum | June 13, 1939 |
| 2,296,063 | Shaw | Sept. 15, 1942 |
| 2,354,027 | Kaminsky | July 18, 1944 |
| 2,355,975 | Henrici | Aug. 15, 1944 |
| 2,460,762 | Minnich | Feb. 1, 1949 |